Dec. 30, 1969     R. W. G. SOMERVELL     3,486,227

CUTTING TOOLS

Filed Feb. 21, 1967

INVENTOR:-
Roland W. G. Somervell,
BY
Wolfe, Hubbard, Voit & Osann,
ATTORNEYS.

United States Patent Office 3,486,227
Patented Dec. 30, 1969

3,486,227
CUTTING TOOLS
Roland W. G. Somervell, Beaconsfield, England, assignor to Wilkinson Sword Limited, London, England, a British company
Filed Feb. 21, 1967, Ser. No. 617,571
Claims priority, application Great Britain, Feb. 24, 1966, 8,086/66
Int. Cl. B26b 13/26, 13/00
U.S. Cl. 30—250                                    5 Claims

ABSTRACT OF THE DISCLOSURE

A pair of scissors primarily intended for cutting cloth, includes a first blade rigid with a first handle and a second blade non-rigid with a second handle. Both second handle and blade are pivotally mounted on the first handle and are interconnected by gear teeth.

---

This invention relates to cutting tools and particularly, but not exclusively, to scissors for cutting cloth or other sheet material.

Scissors which have been proposed hitherto for cutting material lying on a flat surface have been cranked with a view to disarranging the material to be cut as little as possible. With such previously proposed scissors, however, although part of the finger knuckles may remain closely adjacent the flat surface on which the material is lying, the pivot point of the scissors must still be raised whenever the scissors are opened, with resultant tilting of the blade nearest to the flat surface and consequent risk that the intended path of cut will not be followed.

According to the present invention there is provided a cutting tool comprising one cutter member rigid with a handle portion, another cutter member co-operating with the said one cutter member, and a non-integral handle portion co-operating with said other cutter member to produce cutting action between said cutter members.

Further according to the present invention there is provided a cutting tool comprising a first blade rigid with a handle, a second blade pivotally-mounted with respect to the first blade, a second handle pivotally-mounted with respect to the first handle and a coupling between the second blade and the second handle, which coupling enables pivotal movement of the second handle in one sense to cause pivotal movement of the second blade in the opposite sense.

Still further according to the present invention there is provided a pair of scissors comprising a first blade assembly including a rigidly-connected handle portion, and a second blade assembly including a handle portion and a separate blade portion each portion of the second assembly being pivotally connected on spaced axes to the first blade assembly, and being interconnected by a coupling by means of which pivotal movement of the blade portion of the second blade assembly can be effected in a sense opposite to the pivotal movement of the handle portion.

An embodiment of scissors in accordance with the invention will now be described, by way of example, with reference to the accompanying drawings, in which.

Figure 1:
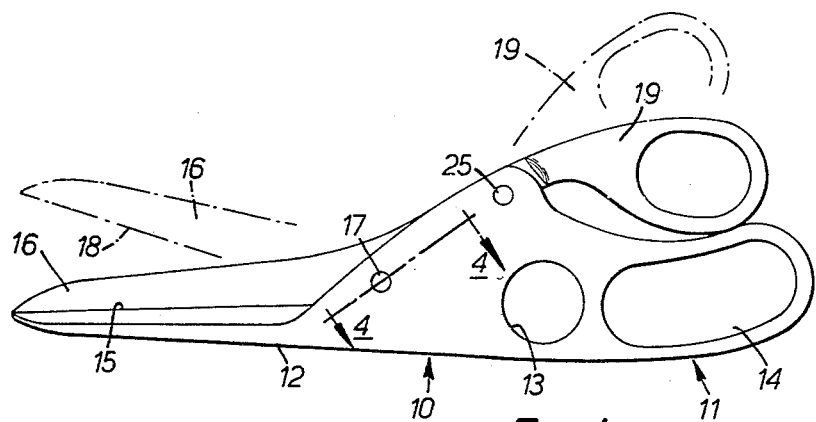
FIG. 1 is a side elevation of the scissors shown in full line in the closed position and, as a fragmentary view, in the chain line in the open position.
Figure 2:
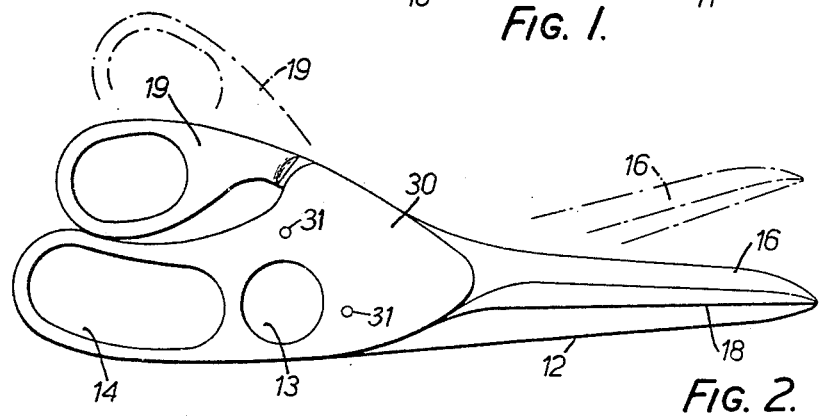
FIG. 2 is a side elevation viewed from the opposite side to that of FIGURE 1, the scissors again being shown in full line in the closed position and, as a fragmentary view, in the chain line in the position position.

Referring now to the drawings, the scissors in accordance with the invention, which are intended for dressmaking and other purposes for which it is desirable that one of the blades should remain substantially parallel to the surface on which the material is being cut, include a first blade 10 which is intergral with a handle or finger knuckle 11 and the non-cutting edge 12 of which is substantially straight or very slightly convex. The lower finger knuckle 11 includes one aperture 13 for the first finger and an elongate further aperture 14 for another two fingers of the user's hand. The cutting edge 15 of the blade 10 is of any suitable conventional form.

Figure 3:
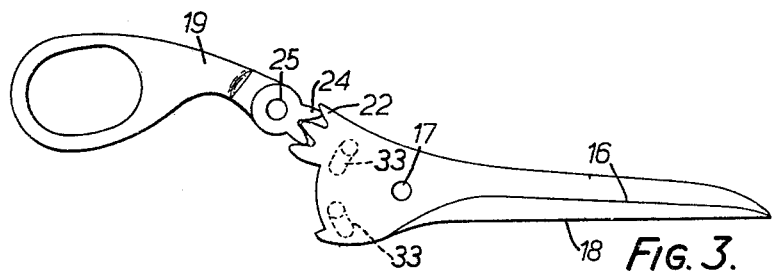
FIG. 3 is a view of a movable blade of the scissors of FIGS. 1 and 2 and the corresponding handle.

The second blade 16 is pivotally connected at 17 to the first or lower blade (as shown in the drawings) and the cutting edge 18 of the second or upper blade is of generally conventional form, but as can be readily appreciated from FIGURE 3 the second blade 16 is not integral with a corresponding handle or finger knuckle 19. The second or upper blade 16 is pivoted about a pin 20 which is rigidly secured in an aperture in the second blade but is a free running fit in a corresponding aperture 21 of the first blade. The end of the upper blade 16 remote from the cutting tip is an integral part of a coupling in the form of one or more, preferably three, teeth 22 of gear form and these teeth are arranged to mesh with another part of the coupling in the form of one or more teeth 24 formed integrally with the finger knuckle 19 which is pivotally mounted about an axis spaced from the axis of the pin 20 on an upwardly-extending portion of the lower blade. It will be appreciated, that movement of the finger knuckle 19 about a pivot 25 in one sense will cause the second blade 16 to pivot in the opposite sense. It will also be appreciated, that means other than gear teeth can alternatively be used to produce this required contrarotation.

Figure 4:
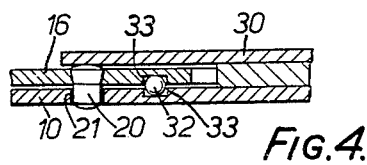
FIG. 4 is a section on the line 4—4 of FIG. 1.

The pivot connection of the two blades is masked by a guard and pressure plate 30 which is secured to the first or lower blade 10 by rivets 31. This plate 30, as can be seen in FIG. 4 assist in producing the necessary interblade pressure required to ensure satisfactory cutting action by direct contact with a domed end of the pivot pin 20 which is fixed to the movable blade 16. The provision of the pressure plate 30 obviates the need for a pivot screw which is not always satisfactory in operation because it generates friction and requires frequent adjustment and re-locking.

In order further to improve the cutting action of the scissors, one or more hard steel balls 32 are interposed between the two blades adjacent the pivot pin 20 but on the opposite side of the pin to the cutting edges 15, 18 of the blades. These balls 32 and grooves 33 or arcuate form in which the balls or other members of circular section run, ensure that the blades are biassed towards one another under all conditions, and also serve to limit the total relative movement of the blades by making the arcuate slots of a desired limited length.

It will be appreciated that, in operation, the lower blade 10 will remain substantially flat on a surface on which material to be cut is lying, and that the upper blade 11 is operated by the corresponding finger knuckle 19 through the gear teeth 22 and 24. The total pivotal movement is limited by the ball and groove arrangement 32, 33.

The scissors in accordance with the invention can be conveniently manufactured from flat stampings with suitably formed, fine-blanked radii on the outer faces and efficient but inexpensively produced scissors can readily be provided. One single stamping may include both the lower blade and one face portion of the finger knuckle, another stamping the pressure plate and the other face portion of the lower finger knuckle, and an intermediate stamping may be in the form of the lower finger knuckle only and act as a spacer between the outer faces of the knuckle.

In a modification of the above described embodiment, the pivot assembly of the two blades takes the form of a hollow bushing which is a force fit in a bore in the upper blade 16 and is free to move in a corresponding aperture in the lower blade. A hard steel ball of slightly larger diameter than that of the bore in which the bushing is captive between one end of that bore and the inner face of the pressure plate. This arrangement again ensures that the pressure is maintained between the blades without undue friction.

I claim:
1. In a cutting tool
   a first cutter member,
   a first handle member rigid with the first cutter member,
   a second cutter member co-operating with the first cutter member,
   a second handle member non-integral but co-operating with said second cutter member to produce cutting action by the cutter member,
   a pivot pin rigid with the second cutter member,
   means defining an aperture in the first blade, said pivot pin being freely movable in said aperture, and
   a pressure plate acting on the pivot pin from the end thereof remote from the aperture in the first blade, said pressure plate being rigid with the first handle.
2. In a cutting tool
   a first member having an aperture therein and a cutting edge,
   a first handle member rigid with the first said member,
   a second member co-operating with the first member and having a cutting edge,
   a second handle member movable independently of but cooperating with said second member to produce cutting action by the cutting edges of said first and second members,
   a pivot pin rigid with the second member and freely movable in said aperture in the first member, and
   a pressure plate acting on the pivot pin from the end thereof remote from the aperture in the first member, said pressure plate being rigid with the first handle.
3. A cutting tool according to claim 1, wherein the pivot pin is of frusto-conical form, at least over a portion thereof engaged in the second blade.
4. A cutting tool according to claim 2, wherein said first handle comprises,
   means defining one aperture for the accommodation of one finger, and
   means defining a second aperture for the accommodation of two fingers.
5. A cutting tool according to claim 2, wherein the pivot pin is frusto-conical form, at least over a portion thereof engaged in the second member.

References Cited

UNITED STATES PATENTS

| 396,291 | 1/1889 | Richard | 30—266 |
| 397,698 | 2/1889 | Cooper | 30—250 |
| 452,260 | 5/1891 | Calahan | 30—266 |
| 632,267 | 9/1899 | Johnson | 30—250 |
| 1,037,827 | 9/1912 | Flory | 30—267 |

ROBERT C. RIORDON, Primary Examiner

J. C. PETERS, Assistant Examiner

U.S. Cl. X.R.

30—267